US012563268B2

(12) United States Patent (10) Patent No.: US 12,563,268 B2
Levy et al. (45) Date of Patent: Feb. 24, 2026

(54) CONTENT RECOMMENDATION IN A MEDIA SERVICE

(71) Applicant: Tubi, Inc., San Francisco, CA (US)

(72) Inventors: Tal Levy, San Francisco, CA (US);
Jaya Kawale, San Jose, CA (US);
Marios Assiotis, Park City, UT (US)

(73) Assignee: Tubi, Inc., San Francisco, CA (US)

( * ) Notice: Subject to any disclaimer, the term of this patent is extended or adjusted under 35 U.S.C. 154(b) by 319 days.

(21) Appl. No.: 18/176,425

(22) Filed: Feb. 28, 2023

(65) Prior Publication Data

US 2024/0292060 A1 Aug. 29, 2024

(51) Int. Cl.
*H04N 21/466* (2011.01)
*H04N 21/258* (2011.01)
*H04N 21/45* (2011.01)

(52) U.S. Cl.
CPC ... *H04N 21/4668* (2013.01); *H04N 21/25891* (2013.01); *H04N 21/4532* (2013.01)

(58) Field of Classification Search
CPC ......... H04N 21/4668; H04N 21/25891; H04N 21/4532
USPC ........................................................ 705/34
See application file for complete search history.

(56) References Cited

U.S. PATENT DOCUMENTS 8,311,390 B2    11/2012  Berry
10,856,053 B1   12/2020  Shi

| 11,336,930 | B1 | | 5/2022 | Gupta | |
| 11,490,163 | B1 | * | 11/2022 | Das | H04N 21/4663 |
| 11,748,988 | B1 | | 9/2023 | Chen | |
| 12,259,895 | B1 | | 3/2025 | Huang | |
| 2008/0263583 | A1 | | 10/2008 | Heath | |
| 2009/0282016 | A1 | | 11/2009 | Gabrilovich | |
| 2012/0242900 | A1 | | 9/2012 | Huang | |
| 2013/0204825 | A1 | * | 8/2013 | Su | G06N 5/02 |
| | | | | | 706/46 |
| 2017/0041684 | A1 | | 2/2017 | Krishnamurthy | |
| 2018/0192158 | A1 | | 7/2018 | Smith | |

(Continued)

OTHER PUBLICATIONS

Wikipedia Contributors. "Multi-armed bandit." Wikipedia, Wikimedia Foundation, Feb. 28, 2023., https://en.wikipedia.org/wiki/Multi-armed_bandit. Accessed Feb. 28, 2023.

(Continued)

*Primary Examiner* — Garcia Ade
(74) *Attorney, Agent, or Firm* — Redbrick IP, P.C.

(57) ABSTRACT

A system and method for content recommendation, including: (i) a computer processor, (ii) a recaller module configured to receive a request for a secondary media item, and identify a set of candidate secondary media items associated with the source media item and (iii) a ranking module executing on the computer processor and configured to enable the computer processor to generate, based on the user identifier, a set of user vectors, a set of secondary media vectors, and a set of source media vectors, execute a machine learning model using the vectors to generate a ranking score for each of the secondary media items, wherein executing the machine learning model includes performing a contextual multi-armed bandit algorithm involving exploration and exploitation of candidate items based on historical data, and return a subset of the set of candidate secondary media items in response to the request.

20 Claims, 10 Drawing Sheets

(56)                References Cited

U.S. PATENT DOCUMENTS

| | | | |
|---|---|---|---|
| 2020/0193552 | A1 | 6/2020 | Turkelson |
| 2021/0065719 | A1 | 3/2021 | Wang |
| 2022/0138805 | A1 | 5/2022 | Lemmons |
| 2022/0150582 | A1* | 5/2022 | Nishimura ......... H04N 21/4668 |
| 2023/0188792 | A1* | 6/2023 | Sahasi ................ H04N 21/4668 |
| | | | 725/46 |
| 2024/0007717 | A1* | 1/2024 | Gupta .............. H04N 21/44222 |
| 2024/0259634 | A1* | 8/2024 | Koshy ................ H04N 21/4826 |
| 2024/0411896 | A1 | 12/2024 | Myers |
| 2025/0077552 | A1 | 3/2025 | Tsai et al. |
| 2025/0103602 | A1 | 3/2025 | Jha |
| 2025/0272317 | A1 | 8/2025 | Aggarwal |

OTHER PUBLICATIONS

Your go-to interactive machine learning library. Feb. 28, 2923., https://vowpalwabbit.org/. Accessed Feb. 28, 2023.
Find Your Next Obsession with Tubi's New GPT-4 Powered Content Discovery Feature https://corporate.tubitv.com/press/find-your-next-obsession-with-tubis-new-gpt-4-powered-content-discovery-feature/.
Fox Corporation Unveils Atlas https://www.foxcorporation.com/news/business/2022/fox-corporation-unveils-atlas/.

* cited by examiner

Recommender Service
120

Recaller Module
121

Ranking Module
122

Feature Extraction Service
123

Model Serving Service
124

Re-ranking Module
125

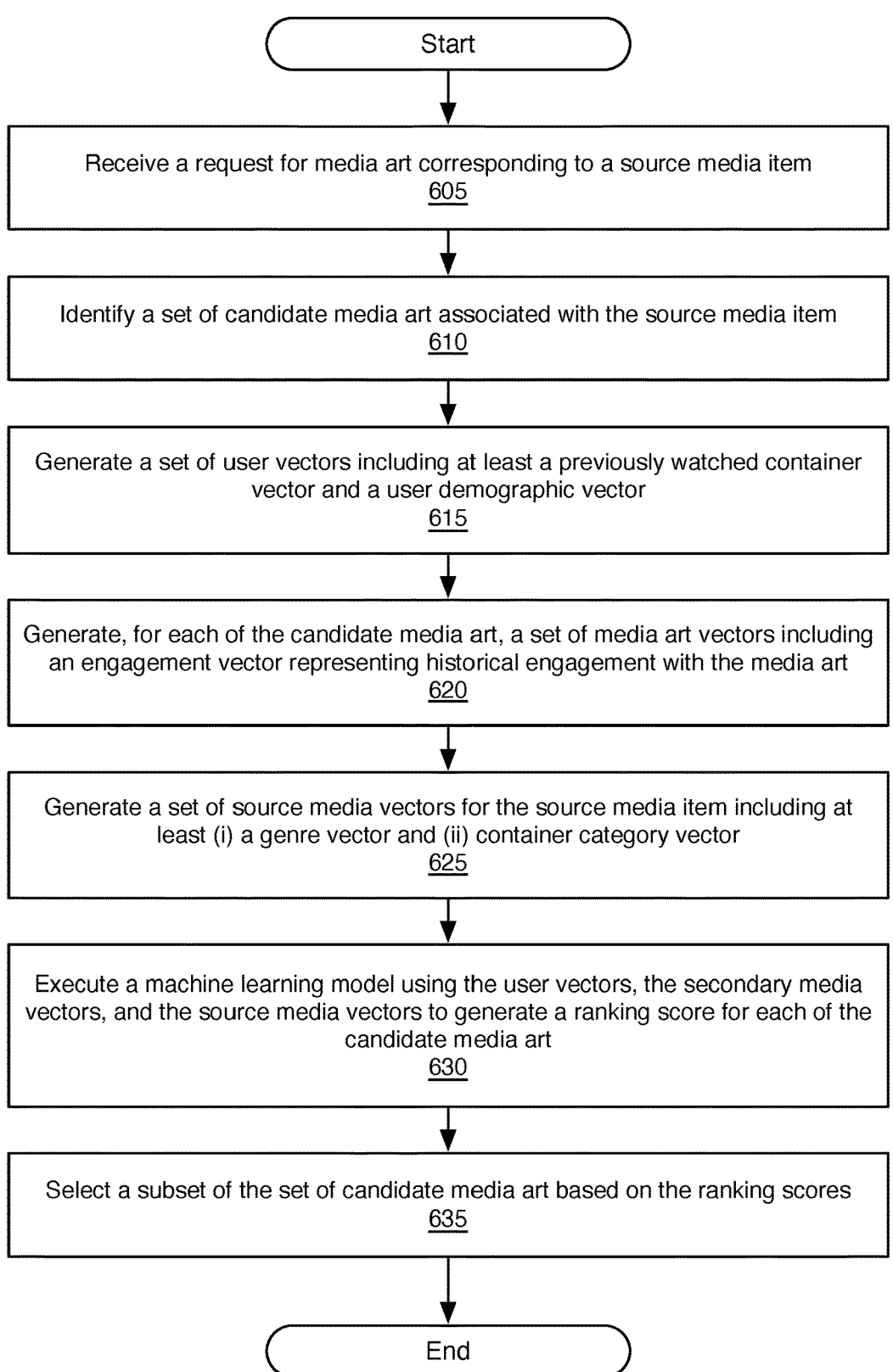

Start

Receive a request for media art corresponding to a source media item
605

Identify a set of candidate media art associated with the source media item
610

Generate a set of user vectors including at least a previously watched container vector and a user demographic vector
615

Generate, for each of the candidate media art, a set of media art vectors including an engagement vector representing historical engagement with the media art
620

Generate a set of source media vectors for the source media item including at least (i) a genre vector and (ii) container category vector
625

Execute a machine learning model using the user vectors, the secondary media vectors, and the source media vectors to generate a ranking score for each of the candidate media art
630

Select a subset of the set of candidate media art based on the ranking scores
635

End

Figure 6

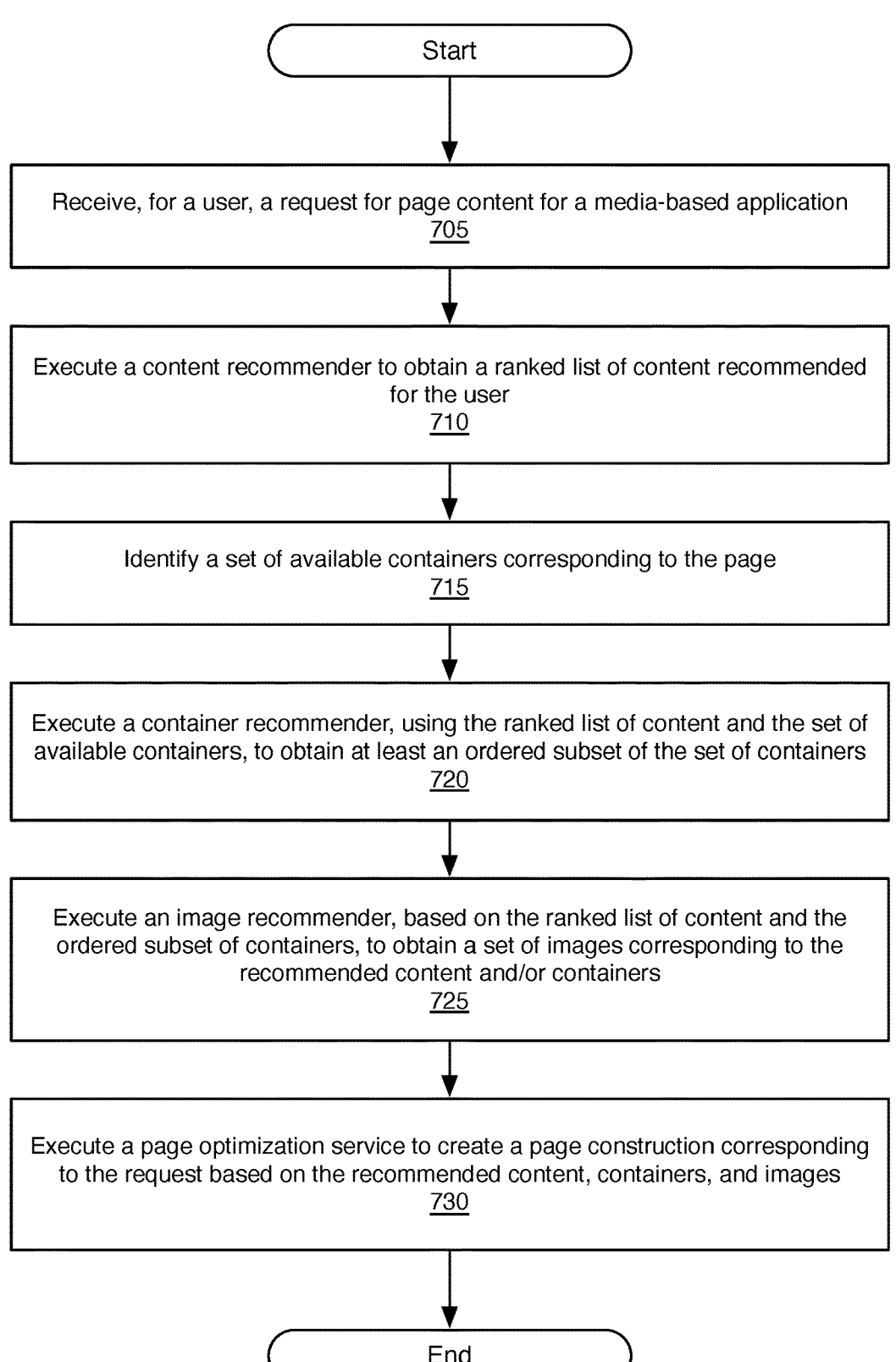

Start

Receive, for a user, a request for page content for a media-based application
705

Execute a content recommender to obtain a ranked list of content recommended for the user
710

Identify a set of available containers corresponding to the page
715

Execute a container recommender, using the ranked list of content and the set of available containers, to obtain at least an ordered subset of the set of containers
720

Execute an image recommender, based on the ranked list of content and the ordered subset of containers, to obtain a set of images corresponding to the recommended content and/or containers
725

Execute a page optimization service to create a page construction corresponding to the request based on the recommended content, containers, and images
730

End

CONTENT RECOMMENDATION IN A MEDIA SERVICE

BACKGROUND

Media platforms such as on-demand video streaming services have become an integral part of everyday life. As a result of the shift from linear programming to on-demand services, consumers are faced with an unprecedented array of entertainment options. In the linear programming paradigm, the competition between providers was based on a lineup of fixed content, each strategically selected to maximize performance against a small and static set of alternatives (e.g., other movie channels). On-demand services make this sort of analysis obsolete. Instead, the focus has shifted towards (i) surfacing the right content to the right consumer at the right time, and (ii) maximizing engagement with said content.

Engagement metrics such as click-through-rate (CTR), bounce rate, and time on page have become essential in the fields of online advertising, marketing, user experience design, and product design. Content creators and providers aim to measure, optimize, and track such metrics in order to compete among a vast and sometimes unknowable set of alternatives that are available to the consumer on-demand.

In the content delivery space, the content does not always speak for itself. In many cases, the content delivery service or provider has wide latitude in the presentation of content through, for example, different preview media or content art. Even if the best content for a given application or user was known in advance, the presentation of that content can greatly affect the user's engagement (or lack thereof).

SUMMARY

In general, in one aspect, embodiments relate to a system for content recommendation. The system can include: (i) a computer processor, (ii) a recaller module configured to receive a request for a secondary media item, and identify a set of candidate secondary media items associated with the source media item and (iii) a ranking module executing on the computer processor and configured to enable the computer processor to generate, based on the user identifier, a set of user vectors, a set of secondary media vectors, and a set of source media vectors, execute a machine learning model using the vectors to generate a ranking score for each of the secondary media items, wherein executing the machine learning model includes performing a contextual multi-armed bandit algorithm involving exploration and exploitation of candidate items based on historical data, and return a subset of the set of candidate secondary media items in response to the request.

In general, in one aspect, embodiments relate to a method for content recommendation. The method can include: (i) receiving a request for a secondary media item, (ii) identifying a set of candidate secondary media items associated with the source media item; (iii) generating a set of user vectors, a set of secondary media vectors, and a set of source media vectors; and (iv) executing, by a computer processor, a machine learning model using the user vectors, the secondary media vectors, and the source media vectors to generate a ranking score for each of the candidate secondary media items, wherein executing the machine learning model includes performing a contextual multi-armed bandit algorithm involving exploration and exploitation of candidate items based on historical data; (v) returning a subset of the set of candidate secondary media items in response to the request.

In general, in one aspect, embodiments relate to a non-transitory computer-readable storage medium having instructions for content recommendation. The instructions are configured to execute on at least one computer processor to enable the computer processor to: (i) receive a request for a secondary media item, (ii) identify a set of candidate secondary media items associated with the source media item; (iii) generate a set of user vectors, a set of secondary media vectors, and a set of source media vectors; and (iv) execute a machine learning model using the user vectors, the secondary media vectors, and the source media vectors to generate a ranking score for each of the candidate secondary media items, wherein executing the machine learning model includes performing a contextual multi-armed bandit algorithm involving exploration and exploitation of candidate items based on historical data; (v) return a subset of the set of candidate secondary media items in response to the request.

Implementations can include one or more of the following items, alone or in combination with other items listed below: content, container, secondary content, and/or page construction recommender services. Recommender services can be configured to execute one or more machine learning models using personalized vector inputs to determine a result set containing one or more recommendations in response to the request.

Other embodiments will be apparent from the following description and the appended claims.

BRIEF DESCRIPTION OF THE DRAWINGS

Embodiments are illustrated by way of example, and not by way of limitation, in the figures of the accompanying drawings and in which like reference numerals refer to similar elements.

FIGS. 5-8 show flowcharts depicting recommender processes in accordance with one or more embodiments.

DETAILED DESCRIPTION

Figure 1:
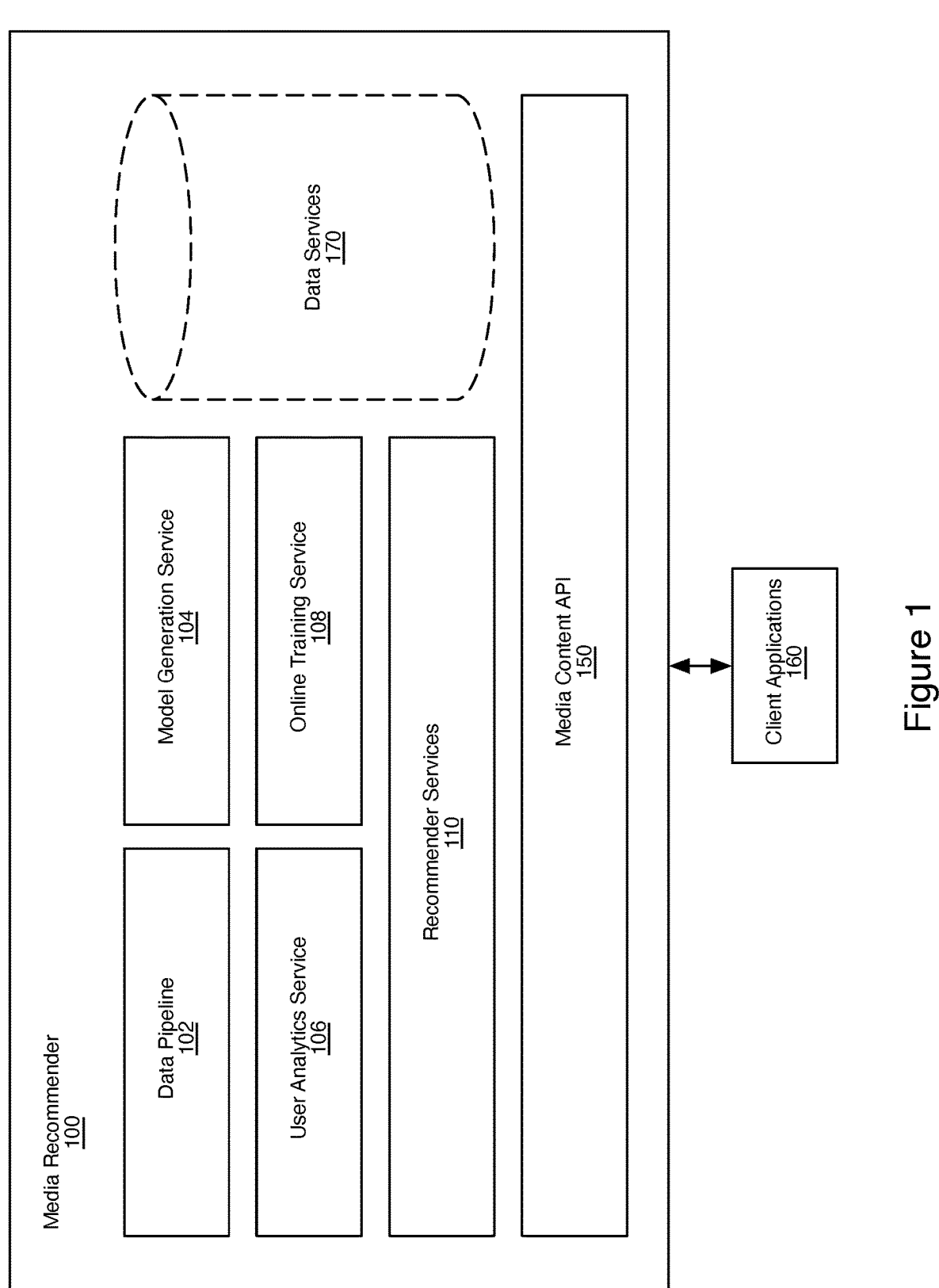
FIG. 1 shows a schematic diagram of a media recommender system, in accordance with one or more embodiments.

A portion of the disclosure of this patent document may contain material that is subject to copyright protection. The copyright owner has no objection to the facsimile reproduction by anyone of the patent document or the patent disclosure, as it may appear in the Patent and Trademark Office patent file or records, but otherwise reserves all copyrights whatsoever.

Specific embodiments will now be described in detail with reference to the accompanying figures. Like elements in the various figures are denoted by like reference numerals for consistency. In the following detailed description of embodiments, numerous specific details are set forth in order to provide a more thorough understanding of the invention. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It will be apparent to one of ordinary skill in the art that the invention can be practiced without these specific details. In other instances, well-known features have not been described in detail to avoid unnecessarily complicating the description.

In general, embodiments of the present disclosure provide methods and systems for content recommendation in a media platform. A client is configured to request media-related content corresponding to a page, container, or other element. One or more machine learning models and business processes are then executed to service the request, and a response containing content associated with one or more media items is provided in response to the request.

FIG. 1 shows a media recommender 100 and one or more client applications 160 in accordance with one or more embodiments. As shown in FIG. 1, the media recommender 100 has multiple components including a data pipeline 102, a model generation service 104, a user analytics service 106, an online training service 108, one or more recommender services 110, one or more data services 170, and a media content application programming interface (API) 150.

In one or more embodiments, the media recommender 100 is a platform for providing media-related content recommendations. For example, the media recommender 100 may store or have access to millions of media content items such as videos, audios, and photos as part of an online video or audio streaming service. The streaming service may provide users with the option to request content on-demand, or may provide different discovery experiences whereby the service is configured to recommend content to the user. These discovery experiences may include various pages of a user interface, and one or more containers corresponding to each page. For purposes of this disclosure, a page is any interface for displaying or presenting content and a container is any sub-element or component associated with a page.

In one or more embodiments, the media recommender 100 is operatively connected with or is a component of one or more other systems. For example, the media recommender 100 may be a component of a video streaming platform (not shown) which is configured to stream video content to consumers via multiple different client devices. In another example, the media recommender 100 provides recommendation services for an audio platform (not shown) configured to provide music, podcasts, and other audio content for consumption by millions of consumer devices.

In one or more embodiments, the recommender services 110 are a collection of one or more services for providing content recommendations in response to a request. Content recommendations may include, but are not limited to, source media items, secondary media items, media attribute data, and/or any type of media or media-related content. For purposes of this disclosure, source media refers to at least a portion of an actual media item, such as an audio, video, or image. Secondary media or content refers to any content that is a derivative or representation of at least one source media item. For example, a thumbnail image may be a secondary media item associated with a video (the source media item). Media attribute data can include any data associated with one or more source or secondary media item(s). Examples of secondary content can include, but are not limited to, media poster art, album art, landscape/thumbnail container images, movie trailers, and audio snippets. Examples of media attribute data can include, but are not limited to, usage metadata, file metadata (e.g., duration, file size, etc.), content metadata (e.g., actor/actress information, year of production, copyright owner, etc.), and textual metadata (e.g., written summary/description, closed captions, etc.). Many other examples of media attribute data can be utilized in accordance with various embodiments of the invention.

In one or more embodiments of the invention, one or more client applications 160 request content recommendations from the media recommender 160. Examples of a client application can include, but are not limited to, a mobile application, a web application, and server-side application, and any other application configured to relay content recommendations which will, either directly or indirectly, result in some type of consumption by one or more end users. Thus, client applications 160 can include intermediary service providers and/or content aggregation services. In one or more embodiments of the invention, a client application can be a research platform which does not present recommendations to end users, but rather, obtains recommendations to perform research and analysis on similar content which is consumed by end users.

In one or more embodiments of the invention, the media content API 150 is a single service, and/or a collection of operatively connected services for providing one or more interfaces to client applications 160. The interfaces can be implemented using representational state transfer (REST), simple object access protocol (SOAP), or any other protocol for client-service communication.

In one or more embodiments of the invention, the media content API 150 includes functionality to receive a request from a client application 160, execute some business logic for servicing the request, and provide a response to the client application 160.

In one or more embodiments of the invention, the media content API 150 includes functionality to receive a request for recommended content. The media content API 150 performs authentication and authorization checks in order to ensure that the requesting entity is authorized to access the data/services that are requested. The media content API 150 can be configured to utilize a role-based access control (RBAC) mechanism and protocol to restrict and protect resources. The media content API 150 then obtains or constructs a response payload based on one or more backend services and/or data services invoked during processing of the request. Examples of backend services include, but are not limited to, recommender services 110, user analytics service 106, online training service 108, and any other services or modules accessible by the media content API 150.

In one or more embodiments of the invention, recommender services 110 is a single service, and/or a collection of operatively connected services for content recommendation. Recommender services 110 may include orchestration or business logic for executing these one or more recommenders and compiling a result in response to a request.

For purposes of this disclosure, a page can be any interface or view for displaying content, either embedded within another page/view or displayed in a user interface including any number of other user interface items, for example. In one embodiment, a page can refer to a top-level view that contains substantially most or all other views displayed to a user in a given context.

In one or more embodiments of the invention, each recommender service 110 includes a machine learning model trained and configured to provide "real-time" recommendations. Thus, in one embodiment, each recommender is an online service executing at least one component of a response loop in response to a client request.

In one or more embodiments of the invention, data services 170 is a single service, and/or a collection of operatively connected services for data storage, caching, manipulation, and/or retrieval.

Figure 2:
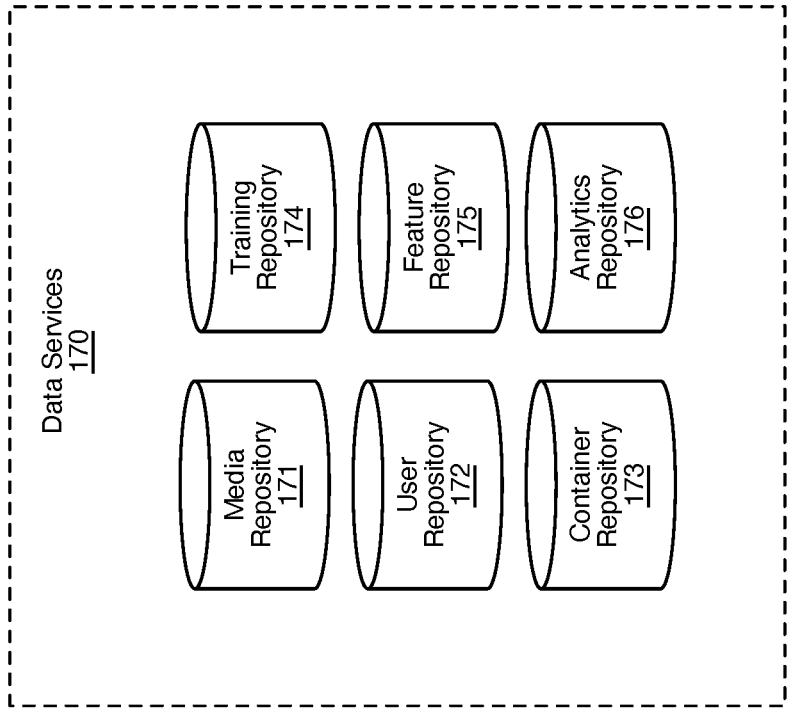
FIG. 2 shows a schematic diagram of data services of a media recommender system, in accordance with one or more embodiments.

FIG. 2 shows an expanded diagram of data services 170 of FIG. 1 in accordance with one or more embodiments. As shown in FIG. 2, data services 170 has multiple components including a media repository 171, a user repository 172, a container repository 173, a training repository 174, a feature repository 175, and an analytics repository 176.

In one or more embodiments of the invention, each repository of the data services 170 includes both business logic and/or storage functionality. For purposes of this disclosure, the terms "repository" and "store" may refer to a storage system, database, database management system (DBMS), or other storage related technology, including persistent or non-persistent data stores, in accordance with various embodiments of the invention.

In one or more embodiments of the invention, data services 170 includes both persistent and non-persistent storage systems. Non-persistent storage such as Redis, Memcached, and an in-memory data store can be utilized to cache data in order to increase performance of frequently accessed data and reduce the latency of requests.

Figure 3:
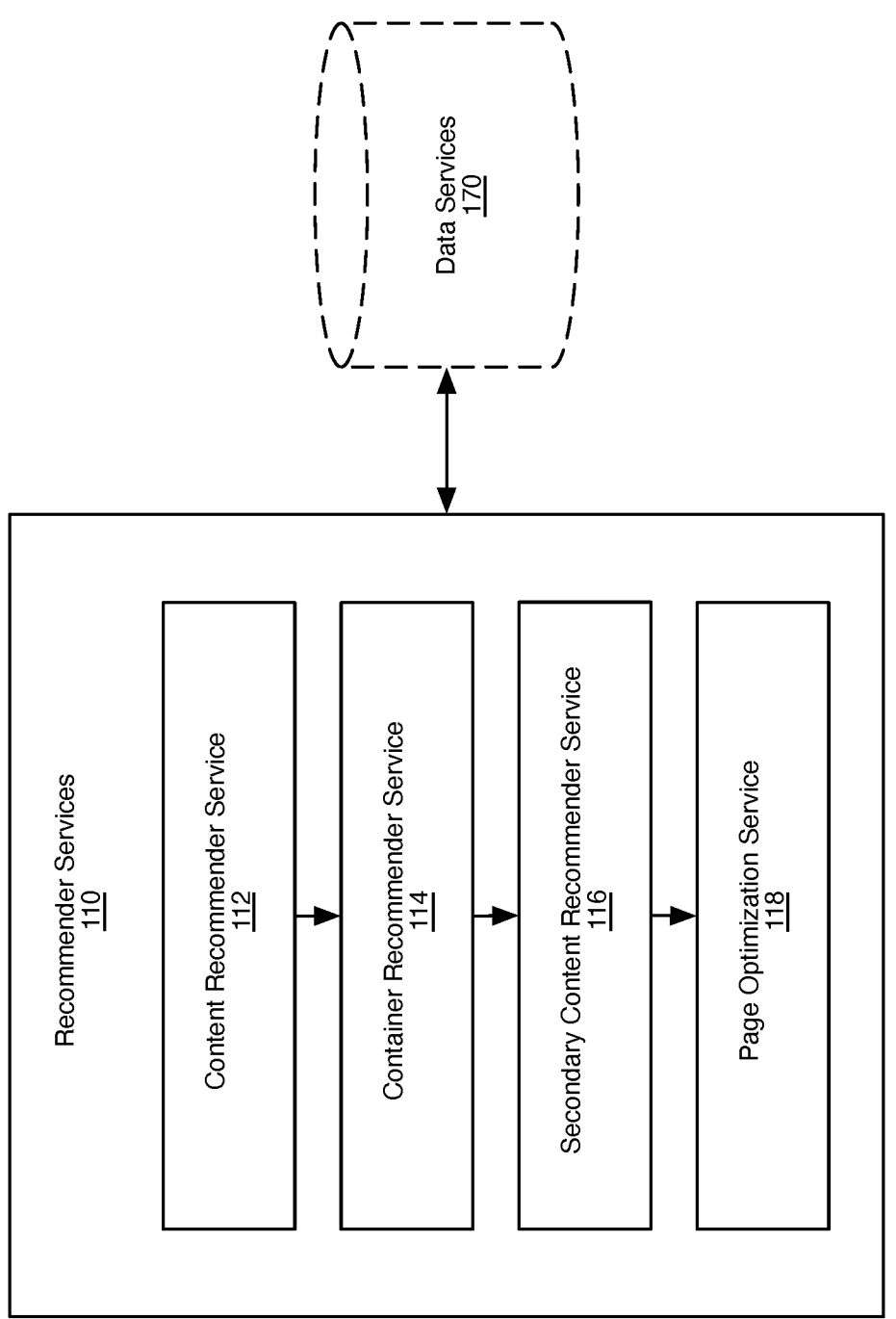
FIG. 3 shows various recommender services of a media recommender system, in accordance with one or more embodiments.

FIG. 3 shows an expanded diagram of recommender services 110 of FIG. 1 in accordance with one or more embodiments. As shown in FIG. 3, recommender services 110 has multiple components including a content recommender service 112, a container recommender service 114, a secondary content recommender service 116, and a page optimization service 118. Each of these is an optional example of a recommender, or recommender service, in accordance with one or more embodiments of the invention.

Figure 4:
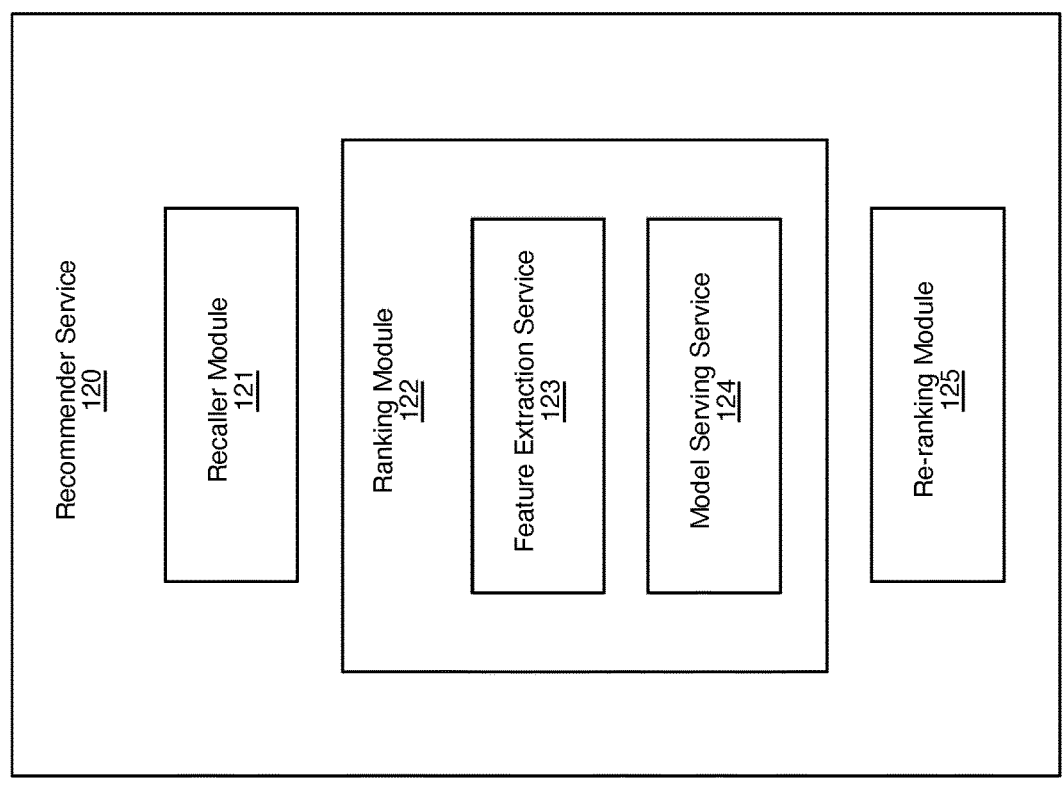
FIG. 4 shows a schematic diagram of a recommender service, in accordance with one or more embodiments.

FIG. 4 shows a schematic diagram of a recommender service 120 in accordance with one or more embodiments. As shown in FIG. 4, the recommender services 120 has multiple components including a recaller module 121, a ranking module 122 including a feature extraction service 123 and a model serving service 124, as well as a re-ranking module 125. Recommender services 110 of FIGS. 1 and 3 are each optionally implemented according to the diagram of FIG. 4, in accordance with various embodiments.

Each of the recommender services 110 is functionally and architecturally different, in accordance with various embodiments. The components of FIG. 4 will be described herein according to each of the recommender service types depicted in FIG. 3 in the following subsections.

In one or more embodiments of the invention, the recaller module 121 includes functionality to receive a request for content (e.g., source content or a secondary media item). The request can include an identifier of a source media item, a user identifier, and a container identifier of a user interface. A user identifier can be an identifier of a user account, an identifier of a device of the user, or any single data item or collection of data items that can be used to identify one or more users.

In one or more embodiments of the invention, the recaller module 121 includes functionality to select a subset of items (also referred to as candidate items) for ranking. If the request for content includes an identifier of a source media item, the recaller module 121 can identify candidate items associated with the identified source media item. In one example, the subset of items is data from the media repository 171 or a cache corresponding to the media repository 171. In this way, the recaller module 121 does a preliminary filtering or selection of data on a larger global dataset. This filtering can be heuristic-based or context-based, and can include one or more filtering criteria. Filtering criteria can be defined by the recommendation request or can be pre-defined, in accordance with various embodiments. Examples of filtering criteria can include, but are not limited to, a type/category of media, a specific container for which media is to be displayed, one or more user preference factors, one or more pre-calculated general ranking scores of each media item, and more. In one example a general ranking score based on content popularity, ranking, or other non-request-specific criteria is calculated and cached or stored for each media item by the media recommender 100. Subsequently, the recaller module 121 identifies a subset of the highest-ranking media items based on their general ranking scores. The recaller module 121 can be configured to provide the selected subset of media items to the ranking module 122 for further selection and/or analysis.

In one or more embodiments of the invention, the ranking module 122 includes functionality to rank one or more content items using one or more machine learning models. The machine learning models may be configured to score one or more of a subset of content items, and, in one embodiment of the invention, the ranking module 122 can be configured to pre-process and/or post-process the inputs and outputs of the model to further refine, modify, or augment the rankings in order to produce a final ranked list of content items. In one embodiment of the invention, the ranking module 122 is configured to rank the content items according to one or more user criteria or context data captured as feature vectors of the machine learning model. Though any number of general or non-user criteria can also be used, the machine learning model provides a personalized ranking of content items and identifies one or more content items relevant to preference factors, attributes, or other criteria associated with a user.

In one or more embodiments of the invention, the re-ranking module 125 includes functionality to reorder and/or inject new items to the output of the ranking module 122 to produce a final ranking. The re-ranking module 125 can be configured to perform re-ranking based on business logic and criteria such as advertising/promotional score enhancement, geolocational factors such as user location being within proximity of a location attribute of the content item, anti-bias heuristics, and/or any other factor.

In one or more embodiments of the invention, the re-ranking module 125 includes functionality to identify a set of business rules for prioritizing media items based on business preferences outside of the ranking module. The re-ranking module 125 can be configured to re-rank candidate secondary media items based on the set of business rules prior to returning a subset of the candidate secondary media items in response to a request.

To avoid over-representation of some content while other content is not visible to a user, a re-ranking module can rearrange the ranked content in order to introduce more novelty and diversity to the home screen.

In one exemplary embodiment of the invention, the recaller module 121, the ranking module 122, and the re-ranking module 125 execute in sequence to produce, rank, and re-rank content items in response to a request. In this example, recaller module 121 is a lightweight module that selects a subset of items that should be ranked out of an entire database of content items. This is based on query filters identifying the content type and region. Continuing the example, the ranking module 122 is a more compute-intensive machine learning module that ranks and personalizes the items returned from the recaller module 121 to the user. Lastly, in this example, the re-ranking module 125 is a final module in the sequence that reorders or injects new items to the final ranking based on business rules and logic.

In one or more embodiments of the invention, the recaller module 121 and the re-ranking module 125 are optional and do not exist in every recommender. For example, in image recommenders there might not be a need for a recaller. In this example, all images would be recalled by the ranking module 122. If there are not any business rules set for re-ranking or if re-ranking is deemed unnecessary, a re-ranker would not be utilized. Accordingly, an image content recommender service 112 can be configured with only a ranking module 122 and associated business logic.

Content Recommender Service

Returning to FIG. 3, the recommender services 110 can include a content recommender service 112. In one or more embodiments of the invention, the content recommender service 112 includes functionality to generate content recommendations such as recommended video, audio, or image content for consumption by an end user. In one embodiment, the content recommender service 112 uses one or more input criteria such as one or more user interface container identifiers, user context data, location context data, demographic context data, historical viewing data, and any other signal for identifying content recommended for a user.

The content recommender service 112 can be configured to fulfill any number of request types. One example of a request type is a request for content in a container of a video streaming service. In this example, a client application such as a smart television application executing on a set-top box or an integrated television device requests content for display in a genre-specific container of a view. The request can include an identifier of the genre, a requesting user account, and/or a view containing the container, as well as any number of other contextual data. Continuing the example, the request is received by the media content API 150 which initiates execution of the content recommender service 112 in response to the request. The media content API concurrently executes one or more additional recommender services 110 in order to generate a final result set of content item identifiers to provide to the client application in response to the request. In this example, the content recommended by the content recommender service 112 is actual video content, i.e., the streaming videos available for streaming to the user.

Container Recommender Service

The recommender services 110 can include a container recommender service 114. In one or more embodiments of the invention, the container recommender service 114 includes functionality to recommend one or more user interface containers for a request. The request can include an identifier of a page, an identifier of a user account, one or more context data items such as geolocation coordinates, and any other data for filtering or relevance in container recommendations, in accordance with various embodiments.

Secondary Content Recommender Service

The recommender services 110 can include a secondary content recommender service 116. In one or more embodiments of the invention, the secondary content recommender service 116 includes functionality to recommend one or more secondary content items in response to a request. As discussed above, each secondary content item may correspond to one or more primary or source content items, such as a video, audio, or image. Requests for secondary content can include an identifier of one or more source content items. For example, a client application of a video streaming service can request recommendations of cover art, previews, and/or one or more thumbnails for a source video. Thus, in one example, the client application provides an identifier of the source video in a REST API call made to the media content API 150. The media content API 150 then executes a service-to-service API call to the secondary content recommender service 116 including the identifier of the source video. The secondary content recommender service 116 executes business logic and/or one or more machine learning models to identify a result set of thumbnail/art images for the source video. The media content API 150 replies to the request with a response payload including an ordered (by rank/score) list of the thumbnail/art images for display by the client application.

In one or more embodiments of the invention, the secondary content recommender service 116 includes functionality to determine that a given secondary content item corresponds to a source media item that is not available for consumption by the user. In this scenario, the secondary content recommender service 116 instead returns a default secondary content item corresponding to the source media and adjusts the predicted performance score of the default item downward according to a predefined weight or amount.

In one or more embodiments of the invention, the secondary content recommender service 116 includes functionality to dynamically generate secondary content in response to a request for content recommendation. Content may be dynamically generated using the source media item as input, for example, and/or may be generated using a pool of related content and content metadata. In one example, a video preview image may be generated by concatenating one or more segments of a source video. In another example, various images of actors, still images of a video, and/or provided media related to the source are used to generate a secondary content item. The generation of secondary content may be performed by a separate machine learning model using feature vectors such as source content attribute information, user vectors, and request attribute vectors as inputs.

After dynamically generating a secondary content item, the secondary content recommender service 116 may be configured to perform prediction on the dynamic content in conjunction with other secondary content items with known or unknown prediction. In this way, dynamically generated content can be ranked and served with other content to ensure content originality and to increase the overall performance of the system. The secondary content recommender service 116 may be configured to rank/predict a mix of dynamic and non-dynamic content in response to each request. For example, the secondary content recommender service 116 may perform dynamic content generation to include at least a predefined number or percentage of candidate content items in each execution of the machine learning model. The secondary content recommender service 116 includes functionality to dynamically generate content online (i.e., in response to recommendation requests) or offline (i.e., prior to the request in which the dynamic content is ranked/analyzed), in accordance with various embodiments of the invention.

In one or more embodiments of the invention, the secondary content recommender service 116 includes functionality to obtain and/or generate one or more feature vectors in response to a request. The feature vectors can include, but are not limited to, context data associated with a source media item, contextual data associated with a requesting user, temporal or geolocational data associated with the request, or any other quantitative representation of a characteristic modeled by the machine learning model.

In one or more embodiments of the invention, the model serving service 124 includes functionality to execute a machine learning model to identify a set of recommended content items in response to a request.

In one or more embodiments of the invention, the model serving service 124 includes functionality to calculate predicted performance values for one or more candidate content items and to rank the candidate content items by their predicted performance values. The model serving service 124 can be configured to utilize a set of performance feature vectors calculated based on actual performance values of one or more candidate content items as inputs. In some cases, as in the example of a cold start scenario when a candidate content item has no prior historical data, or in the example of a warm start scenario when a candidate content item has a quantity of historical data that is less than a defined threshold, the model serving service 124 can utilize strategies to serve the candidate content item in order to allow the content item to accumulate the threshold quantity of historical performance data while minimizing the potentially adverse impact to relevance of items presented to the users.

In one or more embodiments of the invention, the model serving service 124 includes functionality to perform a multi-armed bandit process in order to select the result set of content items. The multi-armed bandit process balances exploration of sufficiently new content items with the exploitation of known high performing content items. In this way, the model serving service 124 allows for cold starting and warm starting newer content items to allow for sufficient experimentation such that the performance of new content items can be determined quickly and efficiently while minimizing the potential adverse impact of poor performing content during the discovery process.

For purposes of this disclosure, performance of a content item can refer to any quantitative metric of a result, output, or user behavior that is intended to be optimized. Examples of a performance metric can include, but are not limited to, a click-through rate, time to start render, time to display, time to interact, bounce rate, time on site, pages per visit, conversion rate, abandonment rate, and any other measurement of user behavior with an application which can be directly or indirectly related to a content item.

Examples of data used to generate feature vectors utilized in content recommendation, secondary content recommendation, and container recommendation, include but are not limited to the following:

i. Internet Movie Database (IMDB, a registered trademark of IMDb.com) ratings/scores. More generally, scores or rankings from any external system configured to rate content.

ii. Historical content popularity (e.g., in the past few days/weeks)

iii. Affinity score for the user to watch the content iv. User designated market area (DMA) features (e.g., popular content in the user's DMA by topic/genre/trends, etc.)

Any combination of the above data types can be featurized and used as inputs to the ranking process.

In one embodiment of the invention, container features are similar to content features except that one or more of the content features for content or content types that are displayed by the container are aggregated to create a container feature for the container. For example, given a container configured to display a row of content items, features of those content items or types can be aggregated to create container feature vectors for the container ranking process.

In one or more embodiments of the invention, the feature extraction service 123 includes functionality to generate and/or utilize one or more user feature vectors. User feature vectors can include, but are not limited to, quantitative representations of user demographic data, gender, age, ethnicity, location (probabilities), prior viewing history of a user (e.g., movie tags, includes genres but also any other characteristics of the movie), previously watched containers, new user indicator (i.e., account recency), user behavior vectors, user engagement vectors, user attribute vectors, user interest vectors, and any other quantifiable attribute associated with a user. User interest categories can also be quantified for use in the machine learning model and can include, but are not limited to, sports, travel, shopping, news, movies, comedy, and technology.

In one or more embodiments of the invention, the feature extraction service 123 includes functionality to generate and/or utilize one or more image feature vectors. Image feature vectors can include, but are not limited to, quantitative representations of user engagement, an image identifier, a number of clicks over time, an image visualization feature, and any number of other quantifiable user features.

In one or more embodiments of the invention, the feature extraction service 123 includes functionality to generate and/or utilize one or more content feature vectors. Content feature vectors can include, but are not limited to, primary genre, container category (e.g., "New Releases", "Classics", "Family Movies", "Reality TV", etc.), container identifier, and any other quantifiable attribute of one or more content items.

In one or more embodiments of the invention, the feature extraction service 123 includes functionality to generate, for each of a set of candidate secondary media items, a set of secondary media vectors. Secondary media vectors can include, but are not limited to, engagement vectors, secondary media attribute vectors, source media attribute vectors, and any other quantifiable attribute associated with a secondary media item. An engagement vector, for example, can represent historical engagement of a particular type with the secondary media over a duration of time.

In one or more embodiments of the invention, given a set of candidate secondary media items, the ranking module 122 includes functionality to identify historical engagement data representing engagement with aggregate secondary media items associated with multiple different source media. The ranking module 122 can be configured to calculate, for each of the candidate secondary media items, a similarity score between some aspect of the historical engagement data and the candidate secondary media item. For example, the ranking module 122 may identify aggregate engagement data associated with a movie or audio genre, such as "science fiction." The ranking module 122 may obtain data indicating that the average science fiction cover art for a movie in the science fiction genre has a click-through rate of twenty percent. In this example, the ranking module 122 scores each candidate cover art with respect to its relevance to the science fiction genre and thereby modifies its estimated performance or other ranking according to the weighted (by relevance) performance of the genre. In another example, the similarity or relevance of each candidate content item to a known aggregate performance metric (e.g., engagement) is used as a feature vector input to the machine learning model. Execution of the model therefore takes into account the relevance and known aggregate performance of the genre in calculating a predicted performance for each particular content item or secondary content item.

In one or more embodiments of the invention, the feature extraction service 123 includes functionality to generate a set of source media vectors for a source media item. Source media vectors can include, but are not limited to, genre vectors, container category vectors, engagement vectors, source media attribute vectors, and any other quantifiable attribute associated with a source media item.

In one or more embodiments of the invention, the feature extraction service 123 includes functionality to generate and/or utilize one or more temporal feature vectors. Temporal feature vectors can include, but are not limited to, a time-of-day vector, a day of week vector, a holiday vector, or any other vector representing a quantifiable attribute involving a duration of time or event.

In one or more embodiments of the invention, the feature extraction service 123 includes functionality to generate and/or utilize one or more similar content feature vectors. These vectors represent similarity of a target content item or container to a known content item or container. For example, the feature extraction service 123 can identify one or more known thumbnail images with the highest identified similarity to each candidate thumbnail image. The similarity can be represented as a vector including a magnitude and direction depicting the strength of the similarity, along with one or more known performance values of the known content. Performance values can include click-through rate and/or other engagement metrics that are selected for optimization. These vectors can be used as inputs to the recommender's machine learning model in order to predict a performance value for each recommendation.

In one or more embodiments of the invention, the feature extraction service 123 includes functionality to generate and/or utilize one or more historical engagement feature vectors. Each historical engagement feature vector can be a category, attribute, genre, or even a specific content item with which the user has the highest affinity or engagement based on past user behavior. For example, the vector can include one or more identified genres and a magnitude or strength of the user association with that genre. This can be represented in a multi-dimensional array with various different magnitudes corresponding to different aspects of the given genre, for example. In this way, the recommender service can utilize past user behavior as a signal to predict future performance of both known and unknown content.

In one or more embodiments of the invention, the feature extraction service 123 includes functionality to generate and/or utilize one or more additional feature vectors. Additional feature vectors can include, but are not limited to, quantitative representations of time of day, day of the week, holidays, person/actor information corresponding to the content item(s) (or even "things", e.g., cars, weapons, etc.), number of people in the image, gender, actor's emotions, specific celebrities the user is a fan of, and more.

In one or more embodiments of the invention, the feature extraction service 123 includes functionality to generate and utilize one or more feature vectors enabling the model serving service 124 to execute a contextual multi-armed bandit process. The contextual aspect of the process can refer to the specific set of feature vectors which are utilized. The resulting system enables personalization of the content serving over time. For example, album art may change in relevance over time and in response to changing circumstances. If an actor Johnny Doe is in the news cycle, a Johnny Doe cover art for a movie may have higher click-through rate during that period of time. The recommender service 120 is thus enabled to adapt and exploit by using the contextual multi-armed bandit process with a variety of feature vectors of different types.

In one or more embodiments of the invention, the feature extraction service 123 includes functionality to generate a vector representation of the image in the numerical space. In this way, the model serving service 124 can be configured to use deep neural network technology to utilize different aspects of an image (or other media type) in recommendation. This allows for a measurable delta between vector representations of two different images.

In one or more embodiments of the invention, the recommender services 110 include functionality to compare, predict, and rank content of disparate types. This may include using known performance of thumbnail images in a similar content feature vector used to select poster images, for example. Any other combination of content type can be used whereby performance correlations can be identified, in accordance with various embodiments of the invention.

In one or more embodiments of the invention, the model serving service 124 includes functionality to generate a ranking score for each of a set of candidate content items. In this way the model serving service 124 outputs a ranking or scoring of the candidate content items according to one or more embodiments of the invention which correspond to different feature vectors as inputs. In one embodiment, the model serving service 124 can be configured to both identify and rank a set of candidate content items, without the need for a recaller to provide candidate content items as inputs to the model. Thus, the model serving service 124 can be configured to execute a machine learning model to perform different types of machine learning/artificial intelligence processes including supervised or unsupervised learning models. Specific models are described herein, each of which can be utilized by an instance of the model serving service 124.

In one or more embodiments of the invention, the model serving service 124 includes functionality to execute a machine learning model to perform entity detection on candidate content items to identify a set of entities. Entities can include, but are not limited to, a person (authors, celebrities, characters), an object, a brand, a genre, a theme, a category, a vehicle, a trademark, an animal, a product, and any other component of a content item (e.g., video, audio, image) that may be of interest to a user in engaging or interacting with the content.

In one or more embodiments of the invention, the ranking module 122 includes functionality to determine an affinity score of one or more entities towards a set of user interest categories or attributes of a user. This may be performed using a heuristic algorithm, human generated values, and/or a machine learning model. After determining the affinity scores, they may be utilized, either as feature vector inputs into the machine learning recommendation model or as part of the re-ranking business logic in calculating and or modifying the ranking scores of one or more content items (e.g., source or secondary content items).

In one or more embodiments of the invention, the model serving service 124 includes functionality to execute a multi-armed bandit upon personalized feature vectors (see above) to provide personalized recommendations for a requesting user account.

One indicator a user might be interested in a poster, is their past interactions with other posters. This can be achieved by calculating a similarity score between the user's past interactions with other posters and the recommended poster.

Another important signal is a user's affinity to a genre. Horror fans, for example, can be interested in different posters than comedy fans. Crossing user's affinity to a genre with the poster recommended can be utilized as a signal for personalizing recommendations.

In one or more embodiments of the invention, the model serving service 124 includes functionality to select a subset of the candidate content items based on the ranking score for each of the candidate content items. This can be done based on a requested page size of an original request obtained by the media content API 150, a fixed content size, a result size threshold, or any predefined threshold for identifying a quantity of items to include in a result set.

In one or more embodiments of the invention, the page optimization service 118 includes functionality to generate a recommended page construction. For purposes of this disclosure, a page construction is a collection of containers and/or content for display in a page/view of a user interface. In the simplest example, the page construction is an ordered or unordered list of containers. In other examples, the page optimization service 118 is configured to include prioritization of the containers or even a specific layout of each container designating its relative or specific location on the page. The page optimization service 118 can be utilized in conjunction with other recommender services in order to create the page construction. FIG. 3 depicts multiple optional recommender services which can be executed in series or in parallel to recommend content, containers, secondary content, and ultimately a page construction. For example, the content recommended by the content recommender service 112 can be selected for display in containers selected by the container recommender service 114 and the secondary content selected by the secondary content recommender service 116 can be selected for display in those containers. Similarly, said containers can then be utilized by the page optimization service 118 to create a page construction.

In one or more embodiments of the invention, the page optimization service 118 includes functionality to generate a set of feature vectors each representing a separate container of the user interface. As depicted in FIG. 4, the feature extraction service 123 performs the generation of said feature vectors.

In one or more embodiments of the invention, the page optimization service 118 includes functionality to select, using a page construction machine learning model, a page optimization dataset. The page optimization dataset can include one or more selected candidate secondary media items for each of the separate containers and a layout specification and prioritization of containers, as discussed above.

In one or more embodiments of the invention, the page optimization service 118 includes functionality to generate the page construction by calculating a predicted performance score for various combinations of containers, content, and layouts and selecting a page construction having the highest predicted performance score. The performance score of a page construction can be based on performance scores of underlying content and containers selected by other recommenders, for example. In fact, the page optimization service 118 may select a lower ranking container and/or content in the final page construction than what was obtained from the other recommenders as input. In this way, the final page construction is not simply a selection of the highest-ranking containers or content. Rather, the page optimization machine learning model selects a combination and/or ordering of the underlying page content that, sometimes counterintuitively, results in the highest predicted performance score for the entire page.

Content in the platform does not appear in a vacuum, and an optimized image for a certain title may perform differently when the title is presented next to others in a container. Hence, the page optimization service 118 provides a holistic recommendation that incorporates context data as feature vectors such as recent viewing history and neighboring content item(s)/containers/views and/or their attributes. For example, given a racing movie, showing a thumbnail image of a car might generate the most interest. However, presented in a container full of racing movies, showing the cast might be a better differentiator that will generate higher engagement. Another example can be selecting a content image based on its "neighborhood" (i.e., neighboring content). Neighboring content might be horror movies, which might indicate that darker images are a better choice. Or content to the left and right may show the full cast in the poster and having the whole grid fit that theme might create better user experience. The page optimization machine learning model utilizes the aforementioned data as vectors, enabling such optimization in real-time.

Returning to FIG. 1, in one or more embodiments of the invention, the model generation service 104 includes functionality to build one or more machine learning models which are subsequently deployed by a continuous integration/continuous delivery (CI/CD) pipeline into the model serving services (124) of one or more recommender services 110. In one embodiment, the model generation service 104 is a single service that trains and deploys multiple separate AI/ML models. In another embodiment, the model generation service 104 is comprised of multiple submodules, each responsible for the build and deployment of a separate model corresponding to a different recommender service type.

In one or more embodiments of the invention, the online training service 108 includes functionality to track the performance of predicted content. For example, when a recommendation is provided to a user for a content item, the online training service 108 or a component thereof detects whether the user engaged with the recommended content item or not. In this example, the online training service 108 stores all user engagements and events in the analytics repository 176. In one embodiment of the invention, the tracking of user engagement and events is performed by a separate analytics service (not shown) which records the events in the analytics repository 176 and/or other data repositories as they occur in real-time. Once the engagement events are recorded, the online training service 108 can utilize the prediction and subsequent engagement to identify training data for use in performing online training.

In one or more embodiments of the invention, the online training service 108 includes functionality to perform continuous or frequent training of a machine learning model based at least partly on production data. The online training service 108 identifies the model inputs (e.g., feature vectors) that generated a prediction, as well as engagement data (or lack of engagement data) subsequent to the prediction. If the engagement matches or aligns with the prediction, a training dataset is generated from the inputs, prediction, and subsequent real-world performance data.

In one or more embodiments of the invention, the online training service 108 includes functionality to aggregate online training datasets from the production environment.

The online training service 108 accumulates the training data and, once a given threshold of training data is obtained, trains and generates a new version of the machine learning model. The online training service 108 can be configured to test the performance of a new model version against one or more other versions in a phased rollout. Alternatively, the new model can perform predictions concurrently with the production model without being utilized in providing recommendations. Rather, the new model recommendations can be logged and compared to the recommendations of the old model to calculate a performance rating of the model over a predefined duration of time. If the new model's performance rating exceeds that of the production model, the online training service 108 can be configured to automatically deploy the new model into production.

In one or more embodiments of the invention, the online training service 108 includes functionality to train the model using negative reward. Negative reward enables the model to learn from non-engagement or negative engagement events. A content item that is displayed and not engaged with or swiped away, for example, may be entered into the training repository 174 as a negative reward training dataset item. In one or more embodiments of the invention, negative reward events are more frequent than engagement events, and therefore the online training service 108 includes functionality to use different mechanisms of selectively training on negative reward events. For example, the online training service 108 can be configured to limit negative learning training data to the first few content items in the top of a home page or top-level view that was not clicked. Any threshold quantity of negative reward events can be used in accordance with various embodiments. A negative reward (a penalty) teaches the machine learning model to update parameters away from a negatively rewarded item.

In one or more embodiments of the invention, the data pipeline 102 includes functionality to ingest, validate, format, and process different types of data utilized by one or more services of the media recommender 100. The data pipeline 102 stores output data in the various repositories of data services 170. For example, the data pipeline 102 obtains user engagement actions from an analytics component of a client application and stores them in a pre-defined format in the analytics repository 176.

In one or more embodiments of the invention, the user analytics service 106 includes functionality to receive requests for analytics data and to provide requested data to one or more requesting services. The user analytics service 106 also includes functionality to push analytics events to one or more listeners (e.g., a webhook configured to obtain real-time event notifications) such as the online training service 108. In this way, required data is processed by the system using an event-driven architecture.

Image Ranking Example

The following is an example utilizing a subset of features to explain the image ranking process from user login through serving, model optimization, and online training.

In this example, the image ranking process starts after the content for the home screen grid has been ranked via content and container recommenders.

Example: Feature Extraction

The request for image ranking starts with extracting content with multiple images from the top positions of the ranked home screen grid. This limit of ranking images from the top positions allows us to make the biggest impact on the grid without causing latency issues from ranking hundreds of images.

The feature extraction service 123 extracts device information from a client request (device_id, dma_id) and uses it to grab extra pre-calculated features from the feature repository 175 (gender probability, age probability and previously watched container). The feature extraction service 123 also uses the grid content to retrieve content related features (genre, container) and image features (image_id, image embeddings) from the feature repository 175. Context features such as day of week and time of day will also be extracted from the request.

Example: Feature Generation

Continuing the example, the feature extraction service 123 formats the features to a format readable by the machine learning model. Each content item is executed as a separate request for prediction with different features for each image and common context, device, and content features.

Continuing the example, the feature extraction service 123 generates cross-features from the image and common features. This mean that in addition to an image feature image_id that tells the model how likely is an image to be clicked, and a device feature dma_id which tells the model how likely it is that a device from a certain DMA (Designated Market Area) will click an image, the model will also have a cross-feature that gives information on how likely it is that an image will be clicked at that specific DMA.

Example: Image Ranking

Continuing the example, the model serving service 124 loads the latest version of the machine learning model and uses it to score each content item separately (getting image ranking for N content items, requires N parallel calls to the recommender service 120 for image ranking).

In this example, each of the model features has a corresponding weight. The model serving service 124 uses these weights to score each image in the prediction request. Prediction scores for images A, B, C might be [0.3, 0.2, 0.7], which corresponds to image A being 30% likely to be clicked, image B 20% likely to be clicked, and image C being 70% likely to be clicked. The model serving service 124 transforms these scores, according to a contextual multi-armed bandit process, to allow for exploration. A 10% epsilon greedy exploration means that the model will select the best image 90% of the time, and explore other images 10% of the time. In this example, the model serving service 124 transforms the scores to [0.05, 0.05, 0.9] and the selected image is sampled from that list with these probabilities (90% probability for image C to be selected, and a combined 10% for A and B).

Example: Serving and Logging

The recommender service serves the selected sampled image to the user's client and the model input and output are logged for further analysis.

Example: Online Learning

Continuing the example, assuming the user clicked one of the suggested images, that data will be saved in the analytics repository 176 via the data pipeline 102. The online training service 108 periodically checks if there is a match between the devices and content that were recently ranked by the recommender(s) and the ones marked as clicked in the analytics repository 176. If there is a match, that example is used to train the model and the newly optimized model and weights are saved for future ranking.

Example: Online Training

In the current example, the model serving service 124 assigned content images A, B, C the probabilities [0.05,0.05, 0.9]. If that content was clicked by the user, a learning example will be created by the user analytics service 106 using the features logged in the prediction phase. The online training service 108 will incrementally update and optimize the weights used for the prediction.

Flowcharts

Figure 5A:
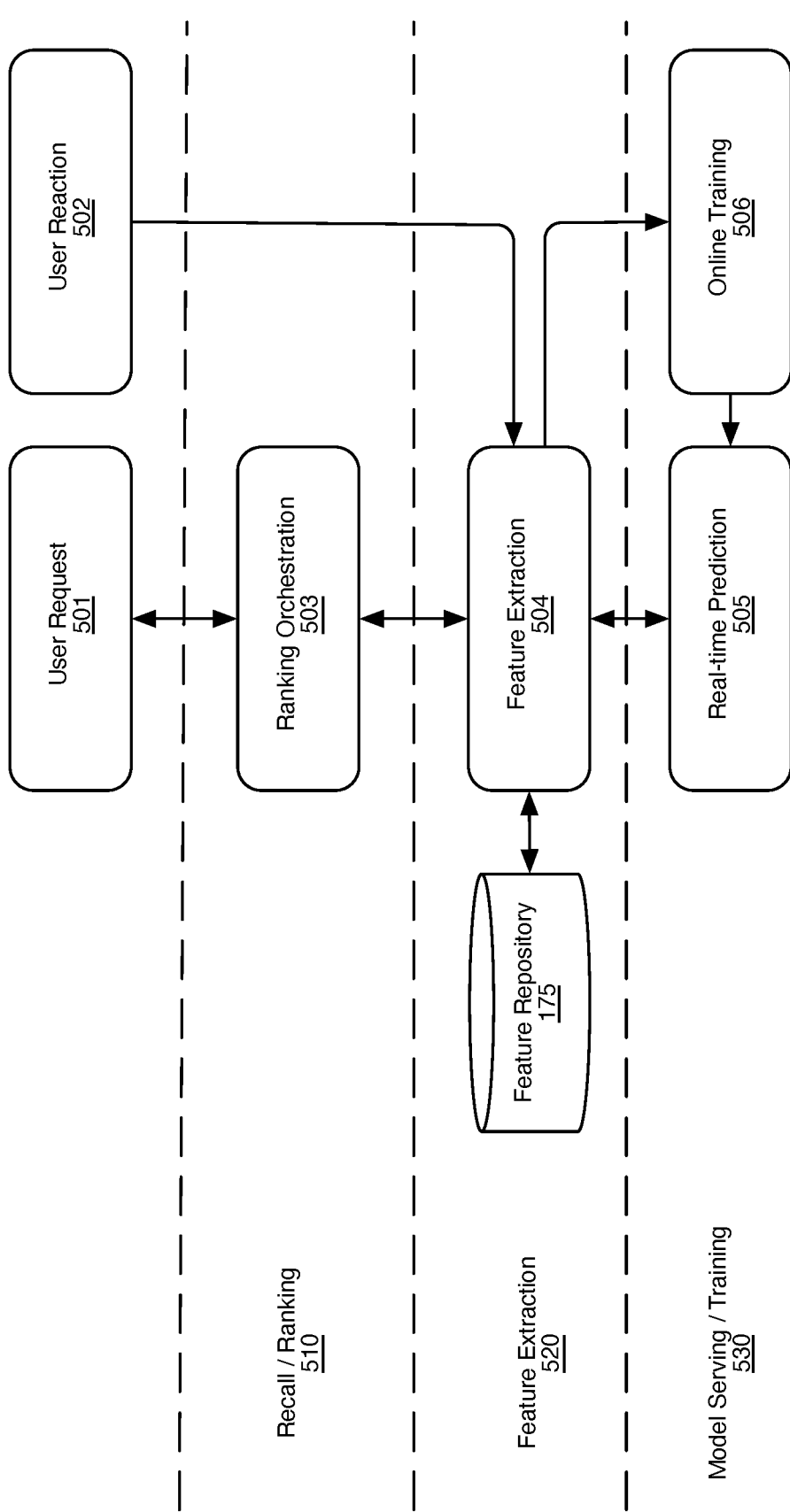

FIG. 5A shows a flowchart of a method for model serving and training of a recommender service. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 5A should not be construed as limiting the scope of the invention.

In STEP 501, a user request is received from a client application. The request includes a container identifier, context data, and an identifier of the user's account. After the initial user request, content and container ranking are executed and a set of content and containers are identified (not shown).

In STEP 503, a ranking orchestration process is executed. The ranking process. The ranking orchestration process includes recall, preliminary filtering or selection of data is performed on a larger global dataset. This filtering can be heuristic-based or context-based, and in this example, will result in a candidate set of secondary content items selected for prediction.

In STEP 504, feature extraction is performed and features are stored in a feature repository 175. Features can be cached in non-persistent memory or persisted for future usage and/or reference. For secondary image art, there will be image features, in addition to common context, device, and content features, as well as cross-features (described above).

In STEP 505, real-time prediction is performed. The prediction involves calculation of a predicted performance value for the candidate images. An epsilon parameter value of the machine learning model defines a relative amount of exploration of unknown or little-known content items versus exploitation of known high-performant content items. Based on the epsilon parameter value, the machine learning model manipulates the predicted performance value to allow for selection of lesser-known images (i.e., those with less user engagement data and analytics data).

In STEP 502, a user reaction event is detected. The user reaction can be a click, view, selection, or other predefined action which is tied to a performance metric that is intended to be optimized by the machine learning model.

In STEP 506, online training is performed. Based on the user reaction event, training data is generated and utilized to perform online training. The result of online training is that a new version of the machine learning model is generated, along with modifications to parameters and weights of the model. The new model is evaluated, and if determined to be more performant than the existing production model, deployed to production for general availability.

Figure 5B:
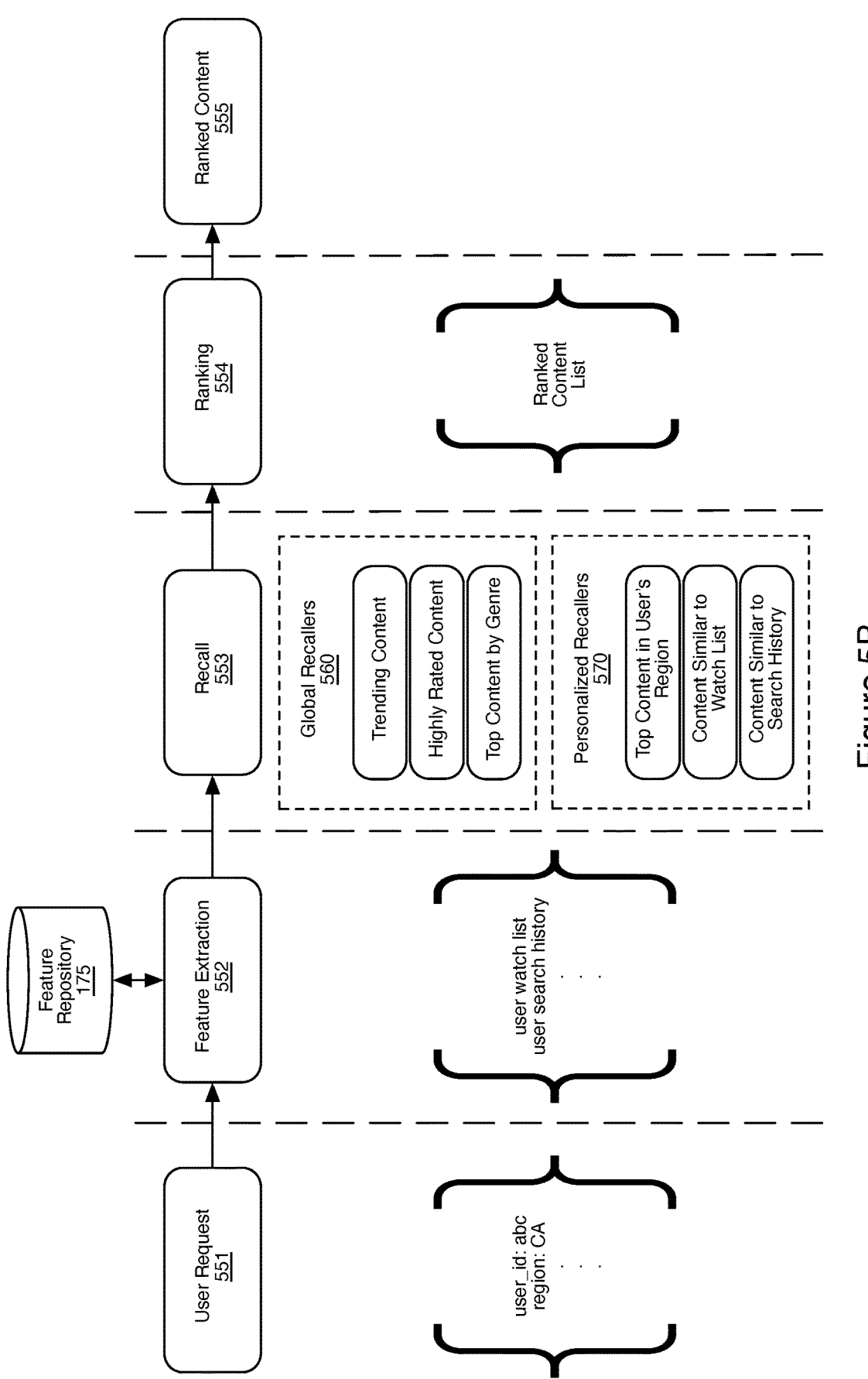

FIG. 5B shows a flowchart of a method for model serving by a recommender service. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 5B should not be construed as limiting the scope of the invention.

In STEP 551, a user request is received from a client application. The request includes a container identifier, context data, an identifier of the user's account (e.g., "user_id" field value "abc"), and an identifier of a geographic region of the user (e.g., "region" field value "CA").

In STEP 552, feature extraction is performed and features are stored in a feature repository 175. Features can include user watch list, user search history, and other user, content features, and any number of other feature types in accordance with various embodiments of the invention.

In STEP 553, a recall process is performed involving preliminary filtering or selection of data on a larger global dataset. The recall process can include filtering data based on global (560) filters such as trending content, highly rated content (e.g., based on user or system content ratings/scores), top content by genre, and any other criteria for content filtering/selection. The recall process can also include filtering data based on personalized (570) filters such as top content in the user's region, content similar to the user's watch list, content similar to the user's search history, and any other criteria for content filtering/selection.

In STEP 554, a ranking process is performed. Ranking in this flowchart is shown as being separated in sequence from feature generation/extraction (STEP 552), although the recall (553) and feature extraction (552) steps can optionally be performed in parallel or in any other order. Although the process of feature extraction and ranking is sometimes depicted as being performed by the same module, e.g., ranking module 122 of FIG. 4, the components can similarly be separated into separate services, containers, and/or components across the technology stack. In STEP 555, the output of the ranking process (a ranked set of content) can then be provided in response to the request.

FIG. 6 shows a flowchart of a method for providing content recommendations in response to a request corresponding to a source media item. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 6 should not be construed as limiting the scope of the invention.

In STEP 605, a request for media art corresponding to a source media item is received. The media art can be any type of media corresponding to a source media.

In STEP 610, a set of candidate media art associated with the source media item is identified. This can be performed as part of a recall process. The candidate previously stored media art and/or dynamically generated media art which is user or context specific.

In STEP 615, a set of user vectors including at least a previously watched container vector and a user demographic vector are generated. In STEP 620, for each of the candidate media art, a set of media art vectors including an engagement vector representing historical engagement with the media art is generated.

In STEP 625, a set of source media vectors is generated for the source media item including at least (i) a genre vector and (ii) container category vector.

In STEP 630, a machine learning model using the user vectors, the secondary media vectors, and the source media vectors is executed to generate a ranking score for each of the candidate media art.

In STEP 635, a subset of the set of candidate media art is selected based on the ranking scores.

FIG. 7 shows a flowchart of a method for providing page content recommendations in response to a request. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 7 should not be construed as limiting the scope of the invention.

In STEP 705, a request for page content for a user is received from a media-based application. The request can include a page identifier and/or a page definition comprising a set of containers, in accordance with various embodiments.

In STEP 710, a content recommender is executed to obtain a ranked list of content recommended for the user. Execution of the recommender can include a separate execution (either in series or in parallel) to obtain a ranking score for each of a set of candidate content items. After all the rankings scores are obtained, a final result set can be generated including a subset of the highest-ranking items.

In STEP 715, a set of available containers corresponding to the page is identified. The containers are obtained from a master list of available containers, based on a view, context, or navigation route of the user in a current session in a client application.

In STEP 720, a container recommender is executed using the ranked list of content and the set of available containers, to obtain at least an ordered subset of the set of containers.

In STEP 725, an image recommender is executed, based on the ranked list of content and the ordered subset of containers, to obtain a set of images (secondary content) corresponding to the recommended content and/or containers In STEP 730, a page optimization service is executed to create a page construction corresponding to the request based on the recommended content, containers, and images.

Figure 8:
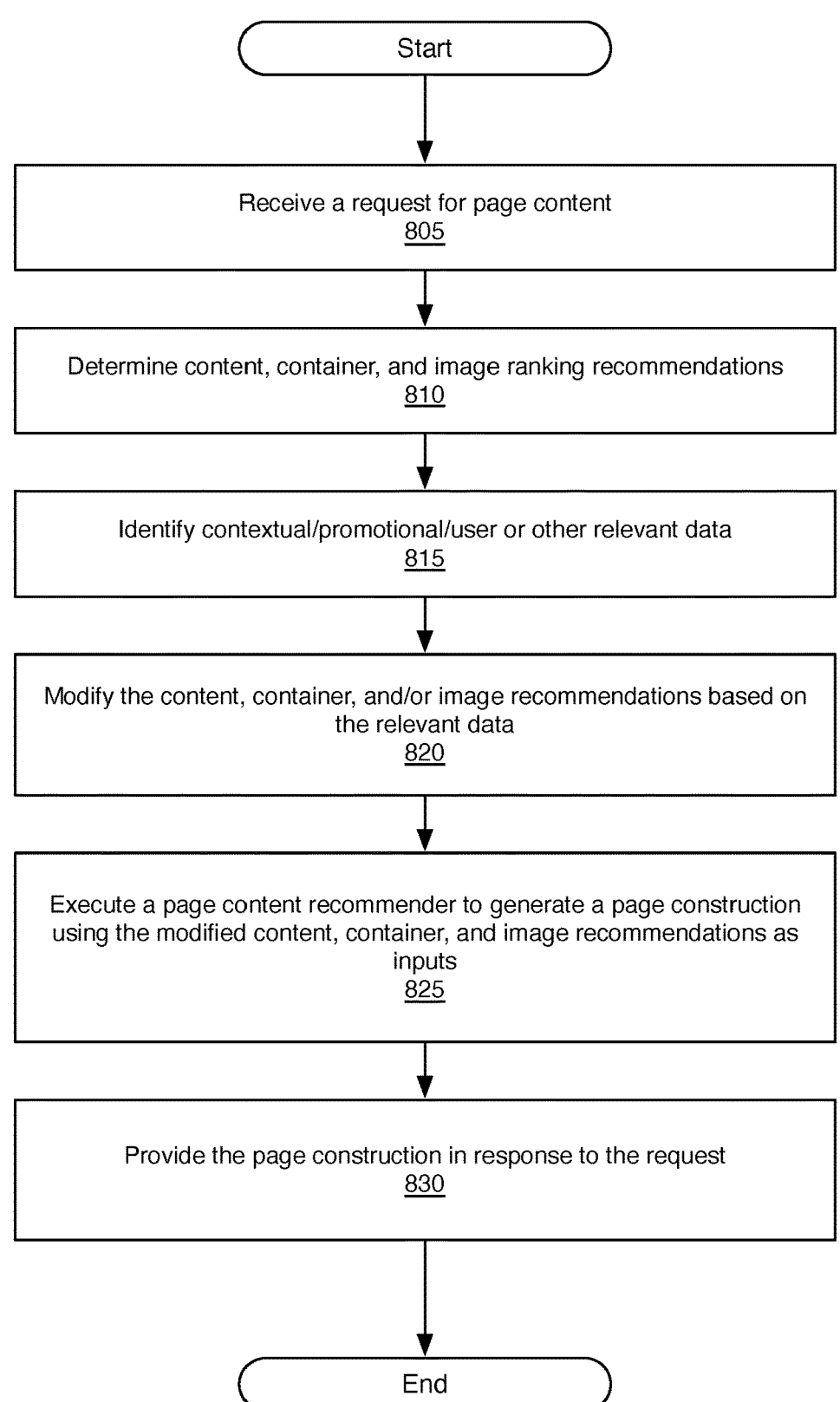

FIG. 8 shows a flowchart of a method for determining a page construction in response to a request. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 8 should not be construed as limiting the scope of the invention.

In STEP 805, a request for page content is received and, in STEP 810, content, container, and image ranking recommendations are obtained from a set of recommender services.

In STEP 815, contextual/promotional/user or other relevant data is identified. In STEP 820, the content, container, and/or image recommendations are modified based on the relevant data. This may be based on business logic defined in a re-ranking process. At least a portion of the data is represented as a set of feature vectors in a standard format upon which a page construction machine learning model has been trained.

In STEP 825, a page content recommender is executed to generate a page construction. The feature vectors, and the modified content, container, and image recommendations are utilized as inputs to the model. In STEP 830, the page construction is provided in response to the request.

In one or more embodiments, a method for content recommendation (e.g., in a media recommender system) includes STEPs 605-635 of FIG. 6, STEPs 705-730 of FIG. 7, and STEPs 805-830 of FIG. 8 performed either sequentially or in parallel. It should be appreciated that in one or more embodiments, any of the steps of FIGS. 6-8 can be executed by the same or different module(s) (or processors).

Although the components of the media recommender 100 are depicted as being directly communicatively coupled to one another, this is not necessarily the case. For example, one or more of the components of the media recommender 100 may be communicatively coupled via a distributed computing system, a cloud computing system, or a networked computer system communicating via the Internet.

Although services may be described with respect to only one computer system, it should be appreciated that said computer system may represent many computer systems, arranged in a central or distributed fashion. For example, such computer systems may be organized as a central cloud and/or may be distributed geographically or logically to edges of a system such as a content delivery network or other arrangement. It is understood that virtually any number of intermediary networking devices, such as switches, routers, servers, etc., may be used to facilitate communication.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Embodiments may be implemented on a specialized computer system. The specialized computing system can include one or more modified mobile devices (e.g., laptop computer, smart phone, personal digital assistant, tablet computer, or other mobile device), desktop computers, servers, blades in a server chassis, or any other type of computing device(s) that include at least the minimum processing power, memory, and input and output device(s) to perform one or more embodiments.

Figure 9:
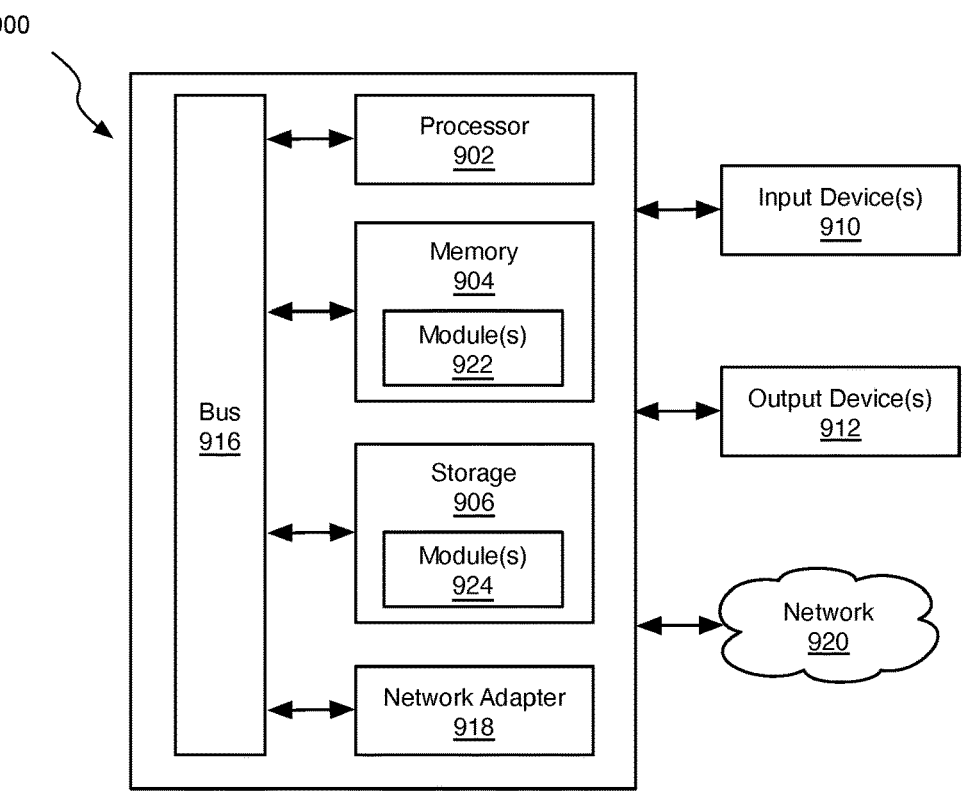
FIGS. 9 and 10 show a computing system and network architecture in accordance with one or more embodiments.

For example, as shown in FIG. 9, the computing system 900 may include one or more computer processor(s) 902, associated memory 904 (e.g., random access memory (RAM), cache memory, flash memory, etc.), one or more storage device(s) 906 (e.g., a hard disk, an optical drive such as a compact disk (CD) drive or digital versatile disk (DVD) drive, a flash memory stick, etc.), a bus 916, and numerous other elements and functionalities. The computer processor(s) 902 may be an integrated circuit for processing instructions. For example, the computer processor(s) may be one or more cores or micro-cores of a processor.

In one or more embodiments, the computer processor(s) 902 may be an integrated circuit for processing instructions. For example, the computer processor(s) 902 may be one or more cores or micro-cores of a processor. The computer processor(s) 902 can implement/execute software modules stored by computing system 900, such as module(s) 922 stored in memory 904 or module(s) 924 stored in storage 906. For example, one or more of the modules described herein can be stored in memory 904 or storage 906, where they can be accessed and processed by the computer processor 902. In one or more embodiments, the computer processor(s) 902 can be a special-purpose processor where software instructions are incorporated into the actual processor design.

The computing system 900 may also include one or more input device(s) 910, such as a touchscreen, keyboard, mouse, microphone, touchpad, electronic pen, or any other type of input device. Further, the computing system 900 may include one or more output device(s) 912, such as a screen (e.g., a liquid crystal display (LCD), a plasma display, touchscreen, or other display device), a printer, external storage, or any other output device. The computing system 900 may be connected to a network 920 (e.g., a local area network (LAN), a wide area network (WAN) such as the Internet, mobile network, or any other type of network) via a network interface connection 918. The input and output device(s) may be locally or remotely connected (e.g., via the network 920) to the computer processor(s) 902, memory 904, and storage device(s) 906.

One or more elements of the aforementioned computing system 900 may be located at a remote location and connected to the other elements over a network 920. Further, embodiments may be implemented on a distributed system having a plurality of nodes, where each portion may be located on a subset of nodes within the distributed system.

In one embodiment, the node corresponds to a distinct computing device. Alternatively, the node may correspond to a computer processor with associated physical memory. The node may alternatively correspond to a computer processor or micro-core of a computer processor with shared memory and/or resources.

For example, one or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface.

One or more elements of the above-described systems may also be implemented using software modules that perform certain tasks. These software modules may include script, batch, routines, programs, objects, components, data structures, or other executable files that may be stored on a computer-readable storage medium or in a computing system. These software modules may configure a computing system to perform one or more of the example embodiments disclosed herein. The functionality of the software modules may be combined or distributed as desired in various embodiments. The computer readable program code can be stored, temporarily or permanently, on one or more non-transitory computer readable storage media. The non-transitory computer readable storage media are executable by one or more computer processors to perform the functionality of one or more components of the above-described systems and/or flowcharts. Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

Figure 10:
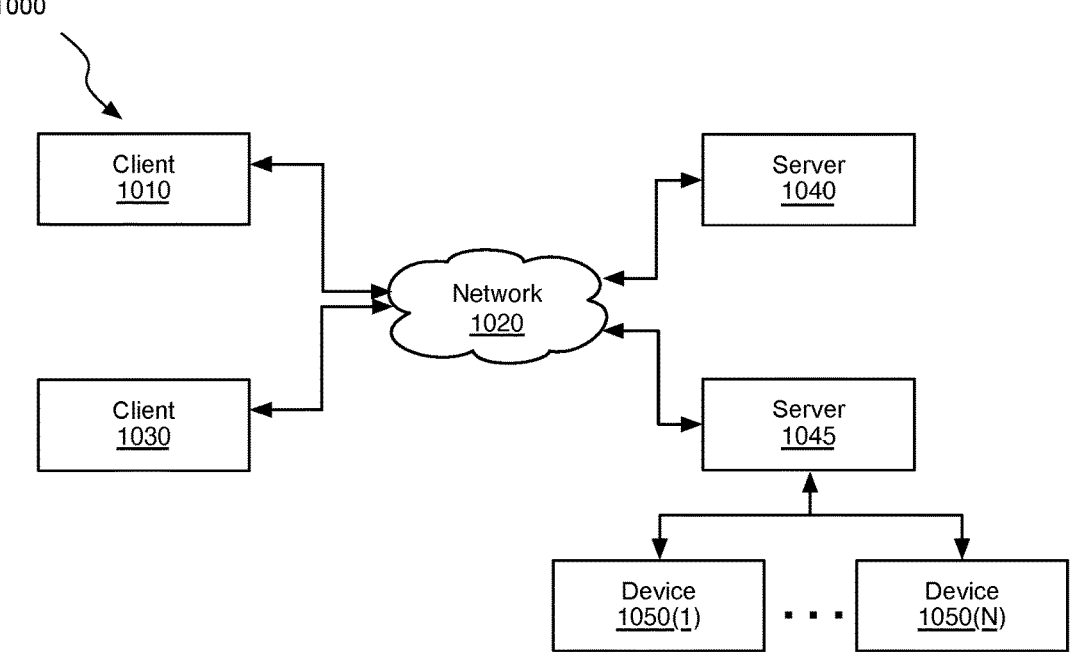

FIG. 10 is a block diagram of an example of a network architecture 1000 in which client systems 1010 and 1030, and servers 1040 and 1045, may be coupled to a network 1020. Network 1020 may be the same as or similar to network 920. Client systems 1010 and 1030 generally represent any type or form of computing device or system, such as client devices (e.g., portable computers, smart phones, tablets, smart TVs, etc.).

Similarly, servers 1040 and 1045 generally represent computing devices or systems, such as application servers or database servers, configured to provide various database services and/or run certain software applications. Network 1020 generally represents any telecommunication or computer network including, for example, an intranet, a wide area network (WAN), a local area network (LAN), a personal area network (PAN), or the Internet.

With reference to computing system 900 of FIG. 9, a communication interface, such as network adapter 918, may be used to provide connectivity between each client system 1010 and 1030, and network 1020. Client systems 1010 and 1030 may be able to access information on server 1040 or 1045 using, for example, a Web browser, thin client application, or other client software. Such software may allow client systems 1010 and 1030 to access data hosted by server 1040, server 1045, or storage devices 1050(1)-(N). Although FIG. 10 depicts the use of a network (such as the Internet) for exchanging data, the embodiments described herein are not limited to the Internet or any particular network-based environment.

In one embodiment, all or a portion of one or more of the example embodiments disclosed herein are encoded as a computer program and loaded onto and executed by server 1040, server 1045, storage devices 1050(1)-(N), or any combination thereof. All or a portion of one or more of the example embodiments disclosed herein may also be encoded as a computer program, stored in server 1040, run by server 1045, and distributed to client systems 1010 and 1030 over network 1020.

Although components of one or more systems disclosed herein may be depicted as being directly communicatively coupled to one another, this is not necessarily the case. For example, one or more of the components may be communicatively coupled via a distributed computing system, a cloud computing system, or a networked computer system communicating via the Internet.

And although only one computer system may be depicted herein, it should be appreciated that this one computer system may represent many computer systems, arranged in a central or distributed fashion. For example, such computer systems may be organized as a central cloud and/or may be distributed geographically or logically to edges of a system such as a content/data delivery network or other arrangement. It is understood that virtually any number of intermediary networking devices, such as switches, routers, servers, etc., may be used to facilitate communication.

While the invention has been described with respect to a limited number of embodiments, those skilled in the art, having benefit of this disclosure, will appreciate that other embodiments may be devised that do not depart from the scope of the invention as disclosed herein.

While the present disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. Some of the steps may be performed simultaneously. For example, in certain circumstances, multitasking and parallel processing may be advantageous. The various example methods described and/or illustrated herein may also omit one or more of the steps described or illustrated herein or include additional steps in addition to those disclosed.

It is understood that a "set" can include one or more elements. It is also understood that a "subset" of the set may be a set of which all the elements are contained in the set. In other words, the subset can include fewer elements than the set or all the elements of the set (i.e., the subset can be the same as the set).

What is claimed is:

1. A media recommender system for addressing cold start problems in content recommendation using a machine learning model, comprising:

a computer processor;

a feature extraction service executing on the computer processor and configured to extract and format feature vectors from at least one data repository:

a recaller module configured to:

receive a request for a secondary media item, wherein the request comprises (i) an identifier of a source media item, (ii) a user identifier, and (iii) a container identifier of a user interface; and identify a set of candidate secondary media items associated with the source media item by performing preliminary filtering on an initial dataset; and a ranking module executing on the computer processor and configured to enable the computer processor to:

generate, based on the user identifier, a set of user vectors comprising at least a previously watched container vector and a user demographic vector, wherein each vector comprises a multi-dimensional numerical representation;

generate, for each of the candidate secondary media items, a set of secondary media vectors comprising at least an engagement vector representing historical engagement with the secondary media, wherein the set of secondary media vectors comprises quantitative representations of user engagement metrics;

generate a set of source media vectors for the source media item comprising at least (i) a genre vector and (ii) a container category vector;

execute the machine learning model using the user vectors, the secondary media vectors, and the source media vectors to generate a ranking score for each of the secondary media items, wherein executing the machine learning model comprises performing a contextual multi-armed bandit algorithm with a configurable epsilon parameter that defines a ratio between involving exploration of candidate items with lesser historical data and exploitation of candidate items with greater historical data, wherein the epsilon parameter controls probability distribution transformation of predicted performance scores;

select a subset of the set of candidate secondary media items based on the ranking score for each of the secondary media items; and return the subset of the set of candidate secondary media items in response to the request.

2. The system of claim 1, wherein the user identifier is an identifier of a device.

3. The system of claim 1, further comprising a re-ranking module configured to:

identify a set of business rules for prioritizing media items based on business preferences outside of the ranking module; and re-ranking the subset of the set of candidate secondary media items based on the set of business rules prior to returning the subset of the set of candidate secondary media items in response to the request.

4. The system of claim 1, wherein the ranking module is further configured to enable the computer processor to:

generate a set of temporal vectors comprising at least one selected from a group consisting of: (i) a time-of-day vector, (ii) a day of week vector, and (iii) a holiday vector, wherein executing the machine learning model is further based on the set of temporal vectors.

5. The system of claim 1, wherein the ranking module is further configured to enable the computer processor to:

identify a set of historical engagement data representing engagement with a second set of secondary media items associated with multiple different source media items; and calculate, for each candidate secondary media item of the set of candidate secondary media items, a similarity score between the set of historical engagement data and the candidate secondary media item, wherein selecting the subset of the candidate secondary media items is further based on the similarity score.

6. The system of claim 5, wherein the ranking module is further configured to enable the computer processor to:

generate a set of similarity vectors comprising the similarity score for each of the set of candidate secondary media items, wherein executing the machine learning model is further based on the set of similarity vectors.

7. The system of claim 1, wherein the ranking module is further configured to enable the computer processor to:

generate a set of user interest vectors representing an interest towards each of a set of user interest categories, wherein the set of user interest categories comprises at least one selected from a group consisting of sports, travel, shopping, news, movies, comedy, and technology, and wherein executing the machine learning model is further based on the set of user interest vectors.

8. The system of claim 7, wherein the ranking module is further configured to enable the computer processor to:

perform entity detection on each of the set of candidate secondary media items to identify a set of entities; and determine an affinity score of each of the set of entities towards the set of user interest categories, wherein executing the machine learning model further comprises utilizing the affinity score of each of the set of entities to calculate the ranking score for each of the set of candidate secondary media items.

9. The system of claim 8, wherein the set of entities comprises at least one selected from a group consisting of a brand, a vehicle, a person, a trademark, an animal, and a product.

10. The system of claim 1, further comprising a page optimization service configured to:

generate a set of feature vectors each representing a separate container of the user interface; and select, using a page construction model, a page optimization dataset comprising selection of at least one final candidate secondary media item for each of the separate containers, wherein selecting the page optimization dataset comprises selection from the subset of the set of candidate secondary media items for a container identified by the container identifier, and wherein the ranking score of the final candidate secondary media items is not a highest ranking score of the ranking scores for each of the candidate secondary media items.

11. A method for addressing cold start problems in content recommendation using a machine learning model, comprising:

receiving a request for a secondary media item, wherein the request comprises (i) an identifier of a source media item, (ii) a user identifier, and (iii) a container identifier of a user interface;

identifying a set of candidate secondary media items associated with the source media item by performing preliminary filtering on an initial dataset;

extracting and formatting feature vectors from at least one data repository;

generating, based on the user identifier, a set of user vectors comprising at least a previously watched container vector and a user demographic vector, wherein each vector comprises a multi-dimensional numerical representation;

generating, for each of the candidate secondary media items, a set of secondary media vectors comprising at least an engagement vector representing historical engagement with the secondary media, wherein the set of secondary media vectors comprises quantitative representations of user engagement metrics;

generating a set of source media vectors for the source media item comprising at least (i) a genre vector and (ii) a container category vector; and executing, by a computer processor, the machine learning model using the user vectors, the secondary media vectors, and the source media vectors to generate a ranking score for each of the candidate secondary media items, wherein executing the machine learning model comprises:

performing a contextual multi-armed bandit algorithm with a configurable epsilon parameter that defines a ratio between involving exploration of candidate items with lesser historical data and exploitation of candidate items with greater historical data, wherein the epsilon parameter controls probability distribution transformation of predicted performance scores;

selecting a subset of the set of candidate secondary media items based on the ranking score for each of the secondary media items; and returning the subset of the set of candidate secondary media items in response to the request.

12. The method of claim 11, wherein the user identifier is an identifier of a device.

13. The method of claim 11, further comprising:

generating a set of temporal vectors comprising at least one selected from a group consisting of: (i) a time-of-day vector, (ii) a day of week vector, and (iii) a holiday vector, wherein executing the machine learning model is further based on the set of temporal vectors.

14. The method of claim 11, further comprising:

identifying a set of historical engagement data representing engagement with a second set of secondary media items associated with multiple different source media items; and calculating, for each candidate secondary media item of the set of candidate secondary media items, a similarity score between the set of historical engagement data and the candidate secondary media item, wherein selecting the subset of the candidate secondary media items is further based on the similarity score.

15. The method of claim 14, further comprising:

generating a set of similarity vectors comprising the similarity score for each of the set of candidate secondary media items, wherein executing the machine learning model is further based on the set of similarity vectors.

16. The method of claim 11, further comprising:

generating a set of user interest vectors representing an interest towards each of a set of user interest categories, wherein the set of user interest categories comprises at least one selected from a group consisting of sports, travel, shopping, news, movies, comedy, and technology, and wherein executing the machine learning model is further based on the set of user interest vectors.

17. The method of claim 16, further comprising:

performing entity detection on each of the set of candidate secondary media items to identify a set of entities; and determining an affinity score of each of the set of entities towards the set of user interest categories, wherein executing the machine learning model further comprises utilizing the affinity score of each of the set of entities to calculate the ranking score for each of the set of candidate secondary media items.

18. The method of claim 17, wherein the set of entities comprises at least one selected from a group consisting of a brand, a vehicle, a person, a trademark, an animal, and a product.

19. The method of claim 11, further comprising:

providing the ranking score for each of the secondary media items to a page construction model, wherein the page construction model is configured to:

generate a set of feature vectors each representing a separate container of the user interface; and select a page optimization dataset comprising selection of at least one final candidate secondary media item for each of the separate containers, wherein selecting the page optimization dataset comprises selection from the subset of the set of candidate secondary media items for a container identified by the container identifier, and wherein the ranking score of the final candidate secondary media items is not a highest ranking score of the ranking scores for each of the candidate secondary media items.

20. A non-transitory computer-readable storage medium comprising a plurality of instructions for addressing cold start problems in content recommendation using a machine learning model, the plurality of instructions configured to execute on at least one computer processor to enable the at least one computer processor to:

receive a request for a secondary media item, wherein the request comprises (i) an identifier of a source media item, (ii) a user identifier, and (iii) a container identifier of a user interface;

identify a set of candidate secondary media items associated with the source media item by performing preliminary filtering on an initial dataset;

extracting and formatting feature vectors from at least one data repository;

generate, based on the user identifier, a set of user vectors comprising at least a previously watched container vector and a user demographic vector, wherein each vector comprises a multi-dimensional numerical representation;

generate, for each of the candidate secondary media items, a set of secondary media vectors comprising at least an engagement vector representing historical engagement with the secondary media, wherein the set of secondary media vectors comprises quantitative representations of user engagement metrics;

generate a set of source media vectors for the source media item comprising at least (i) a genre vector and (ii) a container category vector; and execute the machine learning model using the user vectors, the secondary media vectors, and the source media vectors to generate a ranking score for each of the secondary media items, wherein executing the machine learning model comprises:

performing a contextual multi-armed bandit algorithm with a configurable epsilon parameter that defines a ratio between involving exploration of candidate items with lesser historical data and exploitation of candidate items with greater historical data, wherein the epsilon parameter controls probability distribution transformation of predicted performance scores;

select a subset of the set of candidate secondary media items based on the ranking score for each of the secondary media items; and return the subset of the set of candidate secondary media items in response to the request.

\* \* \* \* \*